United States Patent [19]

Bradley

[11] 4,112,857
[45] Sep. 12, 1978

[54] SPOT PLANTER

[75] Inventor: Edmund G. Bradley, Lithia Springs, Ga.

[73] Assignee: Marden Manufacturing Company, Inc., Auburndale, Fla.

[21] Appl. No.: 734,547

[22] Filed: Oct. 21, 1976

[51] Int. Cl.² ............................................. A01C 11/00
[52] U.S. Cl. ......................................... 111/3; 172/518
[58] Field of Search ................. 111/2, 3, 4, 5, 6, 82, 111/79, 85, 86, 87, 98; 172/518, 519, 525, 526, 536, 538, 549, 551, 555, 15, 31, 642, 349, 350

[56] References Cited

U.S. PATENT DOCUMENTS

| 32,819 | 7/1861 | Brinkerhoff | 111/86 |
|---|---|---|---|
| 222,311 | 12/1879 | Roberts | 111/86 |
| 520,187 | 5/1894 | Kuhns | 111/3 |
| 556,588 | 3/1896 | Risley | 111/81 |
| 1,152,402 | 9/1915 | Draper | 111/2 |
| 1,958,875 | 5/1934 | Weichert | 111/2 |
| 2,765,756 | 10/1956 | Webster | 111/3 |
| 2,815,725 | 12/1957 | Hanson | 111/2 |
| 2,950,770 | 8/1960 | Wilson | 172/538 |
| 3,097,616 | 7/1963 | Arnold | 111/3 |
| 3,261,310 | 7/1966 | Cronk et al. | 111/3 |
| 3,643,611 | 2/1972 | Owens et al. | 111/2 |
| 3,931,774 | 1/1976 | Bradley | 111/3 |

FOREIGN PATENT DOCUMENTS

| 812,219 | 8/1951 | Fed. Rep. of Germany | 111/3 |
|---|---|---|---|
| 161,160 | 9/1960 | U.S.S.R. | 111/2 |
| 351,490 | 10/1972 | U.S.S.R. | 111/2 |
| 401,307 | 3/1974 | U.S.S.R. | 111/2 |

Primary Examiner—Edgar S. Burr
Assistant Examiner—James R. Feyrer
Attorney, Agent, or Firm—Jones, Thomas & Askew

[57] ABSTRACT

The spot planter includes a frame movable forwardly over the ground behind a towing vehicle. A reciprocating dibble is pivotally mounted on the frame and reciprocates toward and away from the ground to cut a series of planting pockets in the ground, and a seedling ejector reciprocates with the dibble and ejects seedlings into the planting pockets. A packing wheel is also mounted on the frame and is positioned behind and to the side of the dibble and also moves toward and away from the ground to engage the ground adjacent the planting pockets and to close the planting pockets about the seedlings. A passenger compartment is mounted on the frame on the other side of the dibble from the packing wheel and a workman repeatedly places a seedling in the seedling ejector and actuates the planting cycle of the machine. The annular ground engaging surface of the packing wheel is concave with the edge away from the dibble being of larger diameter than the closer edge, and the packing wheel rotates on an axis which causes the larger portion of the packing wheel to sweep and compress the dirt adjacent the planting pockets laterally toward the planting pockets to close the planting pockets about the seedlings and to form depressions in the ground adjacent the seedlings substantially without reducing the height of the soil adjacent the seedlings.

5 Claims, 9 Drawing Figures

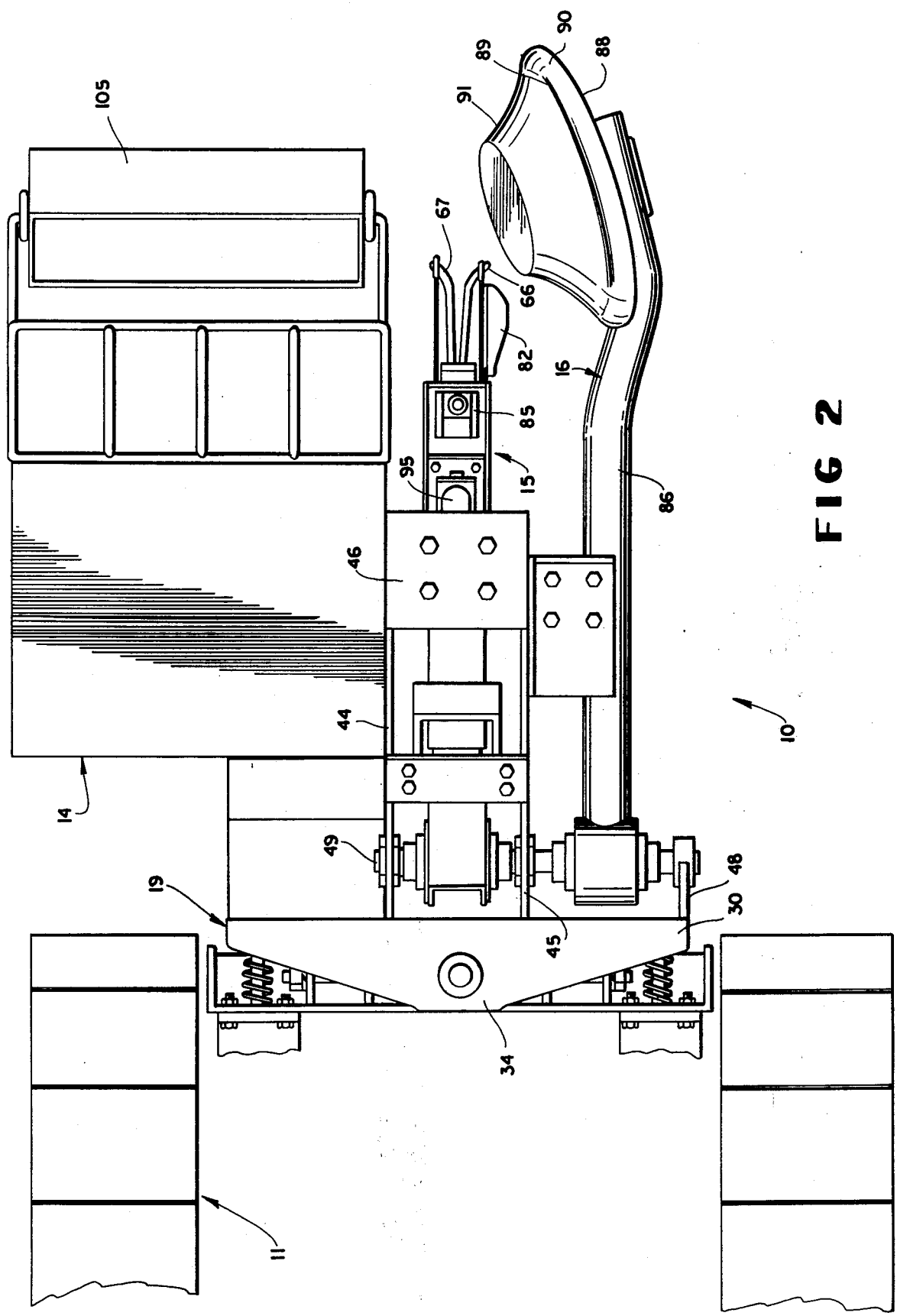

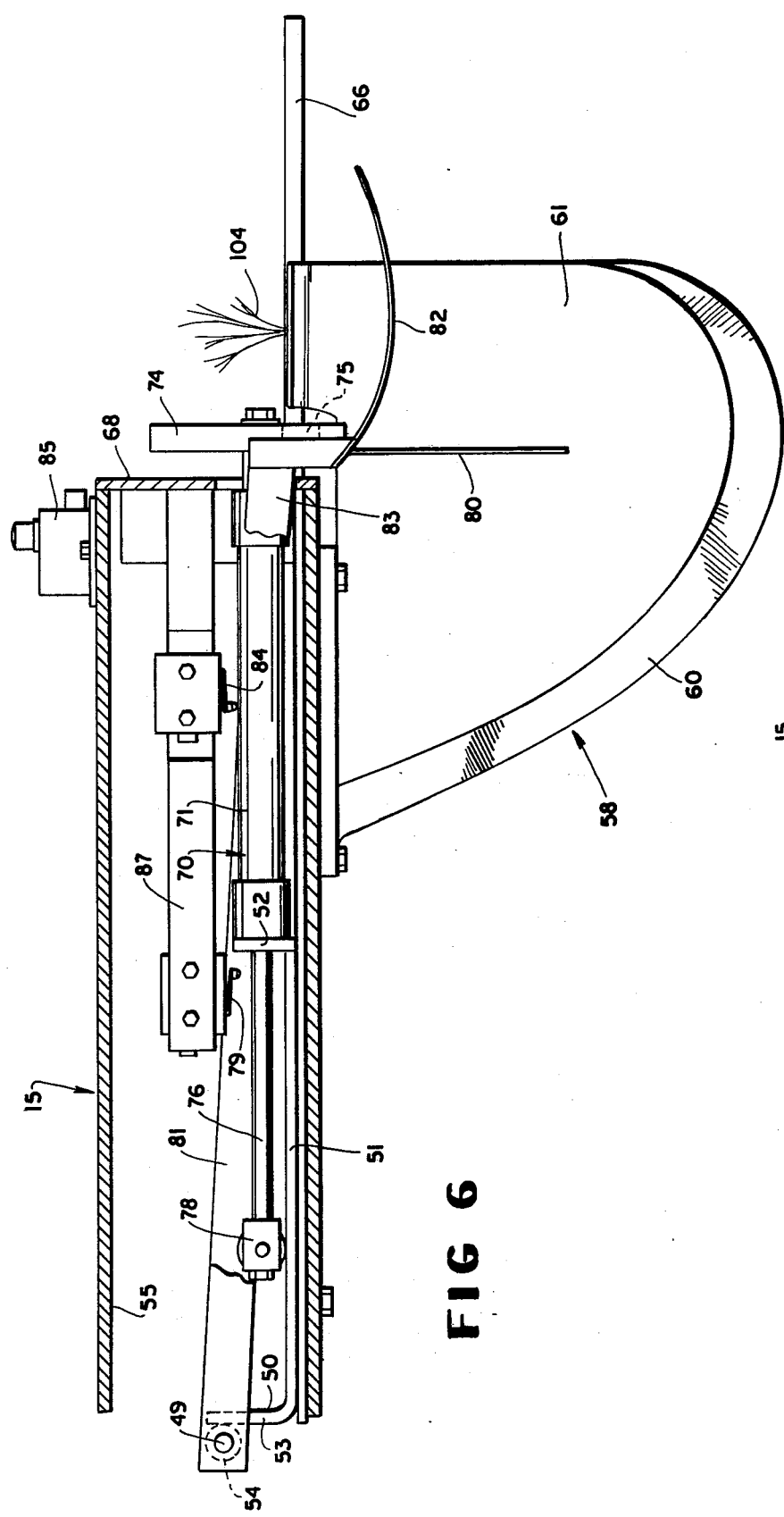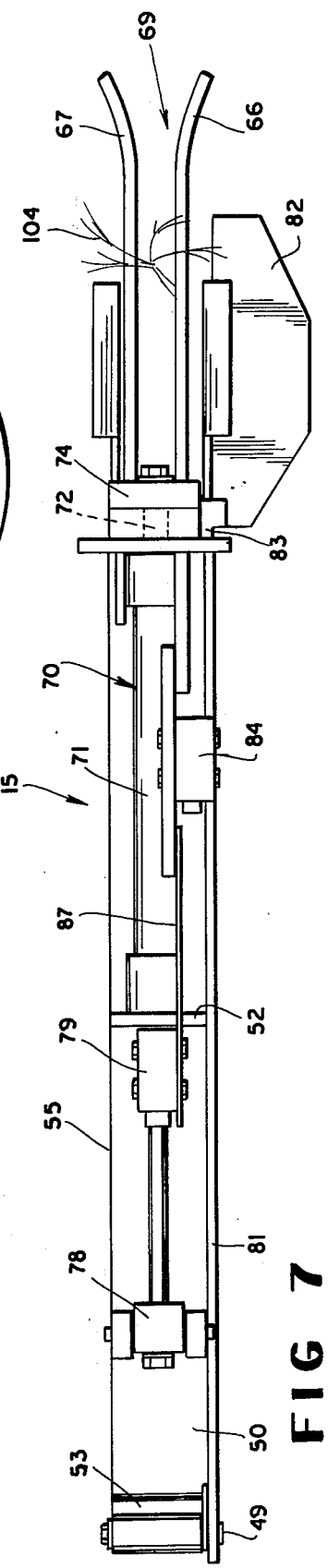
FIG 6
FIG 7

SPOT PLANTER

BACKGROUND OF THE INVENTION

The invention disclosed herein relates to apparatus for planting seedlings, particularly small trees in terrain which is uncultivated and which is likely to include various types of soil and impediments in the soil such as rocks and other hard objects.

In the planting of trees in uncultivated areas, it is desirable to use a self-propelled vehicle which tows or carries a mechanical planting attachment so that the planting of the trees or other seedlings can be performed rapidly and uniformly. Prior art planting machines usually have included a plow or coulter arranged to cut a slice or furrow in the soil and a planting shoe following closely adjacent the plow. The planting shoe usually included a leading wedge shaped edge and a bifurcated following portion which defined an opening in the soil immediately following the cutting edge, and the operator of the machine dropped a seedling into the opening in the soil. A packing element located behind the planting shoe was movable with the planting shoe and engaged the ground to pack the soil around the seedlings. Prior art packing means have included a pair of packing wheels, with each wheel positioned on opposite sides of the furrow in which the seedlings are planted.

In the conventional planting machines as described above, the plow or coulter is usually required to cut a continuous furrow in the earth, and if the plow engages a rock or other hard obstacle in the soil, it may cause the entire planting machine to lift abruptly into the air, which is likely to cause damage to the planting machine and to the worker operating the planting machine. Also, if the plow, planting shoe or any of the other elements of the planting machine should be urged laterally with respect to the towing vehicle, the planting machine is likely to become damaged because of the twisting forces applied thereto.

The use of a pair of packing wheels run along opposite sides of the seedlings to pack the soil adjacent the seedlings usually reduces the height of the soil about the seedlings and frequently tends to expose the upper roots of the seedlings. In those prior art devices where the packing wheels continuously engage the earth, continuous furrows are formed on opposite sides of the row of seedlings, and subsequent rains are likely to cause washouts, further exposing the roots of the seedlings if not completely washing the seedlings from the soil. Also, the packing of the soil downwardly by the packing wheels occasionally causes air pockets to be formed around the lower roots of the seedlings.

SUMMARY OF THE INVENTION

Briefly described, the present invention comprises a spot planter which is connectable to a towing vehicle, such as a tractor, and is towed behind the tractor. The spot planter includes a passenger compartment for a worker who sits facing opposite the forward direction of movement of the planter. A reciprocating dibble moves up and down adjacent the passenger compartment to repeatedly penetrate the earth and form planting pockets in the earth. A seedling ejector moves with the dibble, from a position beside the passenger compartment where the worker inserts seedlings in the ejector, to a lowered position with the dibble where the ejector ejects the seedlings into the planting pockets formed by the dibble. A packing wheel reciprocates down and up behind and beside the dibble into and out of engagement with the soil to close the planting pockets around the seedlings. The packing wheel includes an annular ground engaging surface that has its side portion thereof away from the dibble formed with a large diameter and the side portion thereof adjacent the dibble formed with a smaller diameter, and the axis of rotation of the packing wheel is inclined upwardly toward the dibble and forwardly with respect to the direction of movement of the spot planter, so that when the packing wheel is urged downwardly to the earth, it tends to sweep and compress the soil from one side of the planting pocket toward the planting pocket, thereby closing the planting pocket substantially without reducing the height of the soil about the seedling and usually without forming an air pocket in the lower root zone of the seedling.

The dibble or planting shoe of the spot planter includes a wedge-shaped soil penetrating tool and a pair of parallel side walls extending rearwardly therefrom to form the planting pocket in the soil. One of the side walls of the dibble includes a relief or cut-out portion along its rear edge which tends to reduce the tendency of the soil from forming a clod between the side walls and thereby avoiding obstructing the pocket of the dibble.

Thus, it is an object of this invention to provide a spot planter for planting seedlings and the like which functions to rapidly plant seedlings in the ground and packing the soil adjacent the seedlings substantially without reducing the height of the soil adjacent the seedlings.

Another object of this invention is to provide a method and apparatus for planting seedlings which requires a minimum of power to operate and which functions to plant the seedlings within various types of soil and with a minimum damage to the seedlings.

Other objects, features and advantages of this invention will become apparent upon reading the following specification, when taken in conjunction with the accompanying drawings.

BRIEF DESCRIPTION OF THE DRAWINGS

FIG. 2 is a top view of the spot planter.
FIG. 6 is a side view of the dibble assembly and seedling ejector.
FIG. 7 is a top view of the dibble assembly and seedling ejector.

DETAILED DESCRIPTION

Figure 1:
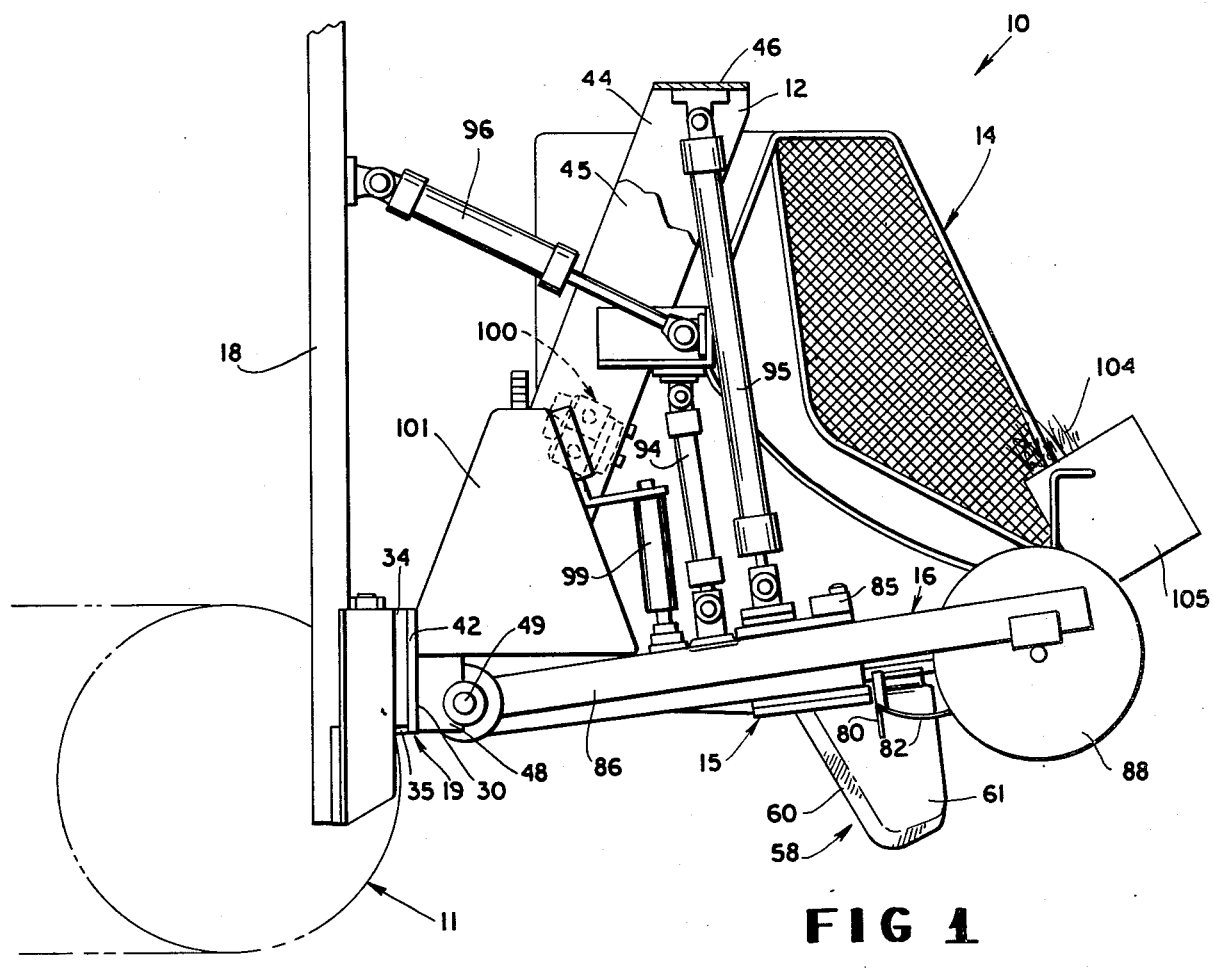
FIG. 1 is a side elevational view of the spot planter.
Figure 4:
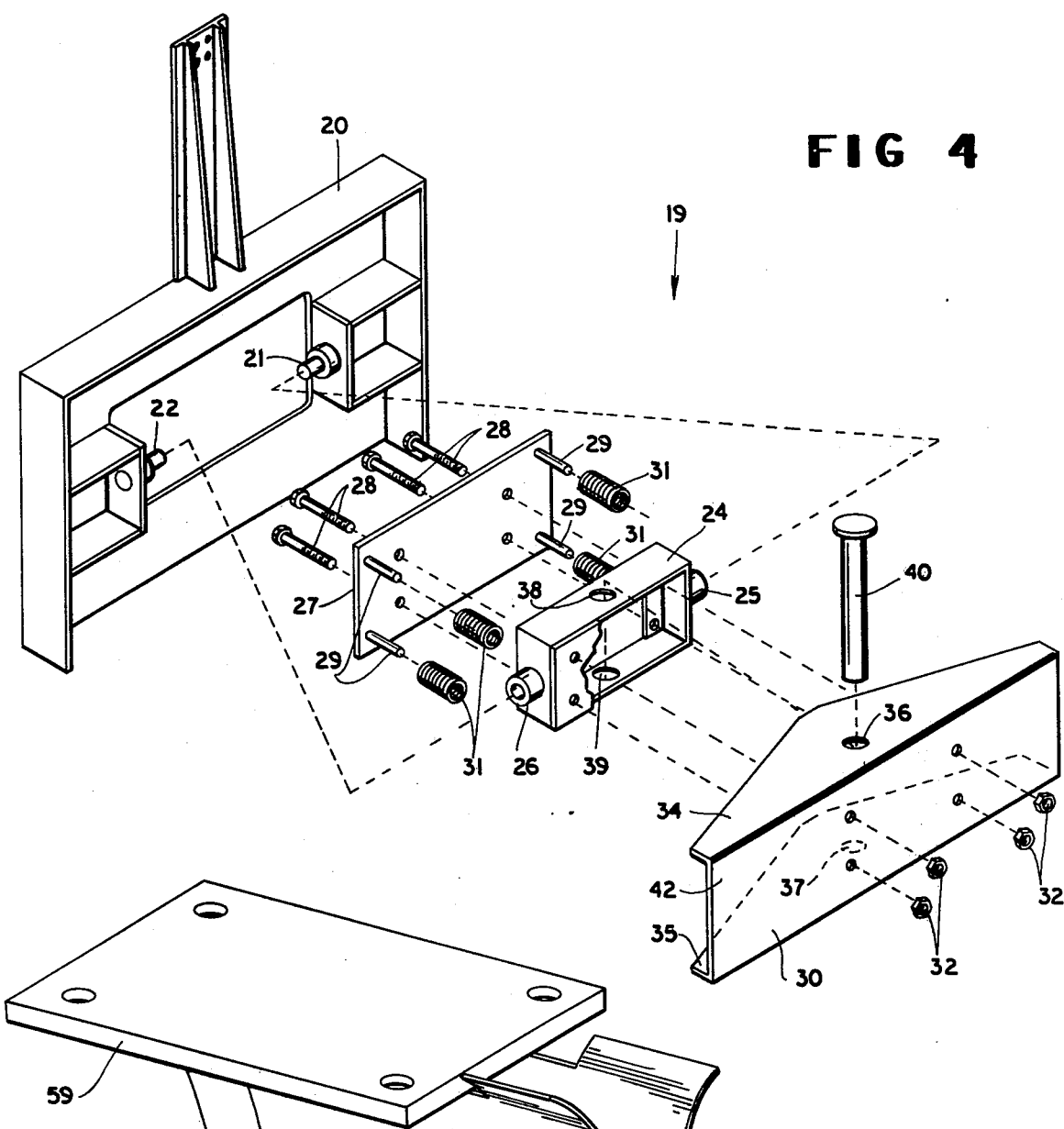
FIG. 4 is a perspective illustration of the mounting means for the frame of the spot planter.

Referring now in more detail to the drawings, in which like numerals indicate like parts throughout the several views, FIG. 1 shows the spot planter 10 which is connected to a towing vehicle such as tractor 11, and which includes a support frame 12, passenger compartment 14, dibble assembly 15, and packing wheel assembly 16. Support frame 12 is connected to a mounting plate 18 which is bolted to the back of the tractor 11. A gimbal assembly 19 (FIG. 4) is rigidly connected to the lower portion of backing plate 18 and includes a gimbal housing 20 with inwardly protruding gimbal pins 21 and 22. Gimbal box 24 includes sockets 25 and 26 which receive the gimbal pins 21 and 22 so that the gimbal box 24 is pivotable about a horizontal axis in the gimbal housing. Gimbal box backing plate 27 is rigidly connected to gimbal box 24 by means of bolts 28, and spring pins 29 project rearwardly from the backing plate outside the confines of gimbal box 24. Frame element 30 of the support frame 12 of the spot planter is mounted on the spring pins 29, with the coil compression springs 31 surrounding the spring pins 29 and positioned between the gimbal box backing plate 26 and the frame element 30. The spring pins are threaded on their ends, and nuts or similar locking elements 32 engage the threaded ends of the spring pins and urge the frame element 30 toward the backing plate 26 against the bias of the springs 31. Frame element 30 includes upper and lower overhanging flanges 34 and 35 which define aligned apertures 36 and 37 therein which are alignable with the upper and lower apertures 38 and 39 of the gimbal box 24, and connecting pin 40 is insertable downwardly through the aligned apertures 36–39 to pivotally mount the frame element 30 to the gimbal box 24. Thus, the frame element 30 is pivotable about a vertical axis through the connection pin 40 and through a horizontal arc against the bias of the coil compression springs 31, and the frame element 30 is pivotal about a horizontal axis extending through the gimbal pins 21 and 22 of the gimbal housing 20 and through a vertical arc.

Figure 3:
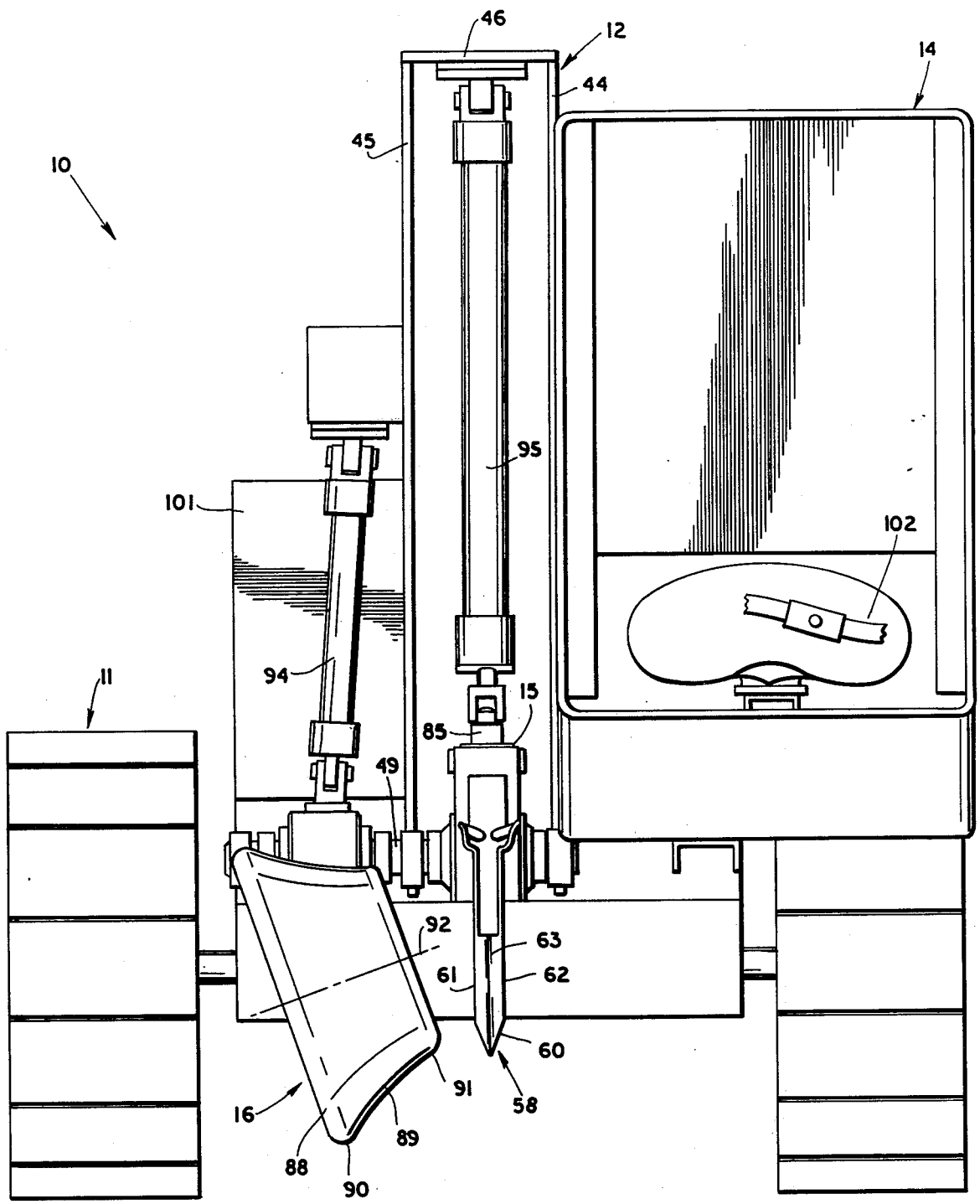
FIG. 3 is a rear view of the spot planter.

As illustrated in FIGS. 1–3, the support frame 12 includes the frame element 30 which includes the upper and lower overhanging flanges 34 and 35, intermediate plate 42, and rearwardly projecting sections supported by the intermediate plate 42. Sections 44 and 45 of the frame extend rearwardly and are inclined upwardly and are connected at their upper ends by platform 46. Rearwardly projecting section 48 and sections 44 and 45 provide a support for axle 49. Passenger compartment 14 is mounted on support frame 12.

As best illustrated in FIGS. 6 and 7, dibble assembly 15 is mounted on axle 49 and include bracket 50 with a laterally extending section 51 and upwardly turned ends 52 and 53. The end 53 is rigidly connected to socket 54 that surrounds axle 49. Housing 55 is connected to the bracket 50 and planting shoe or dibble 58 is bolted to the housing.

Figure 5:
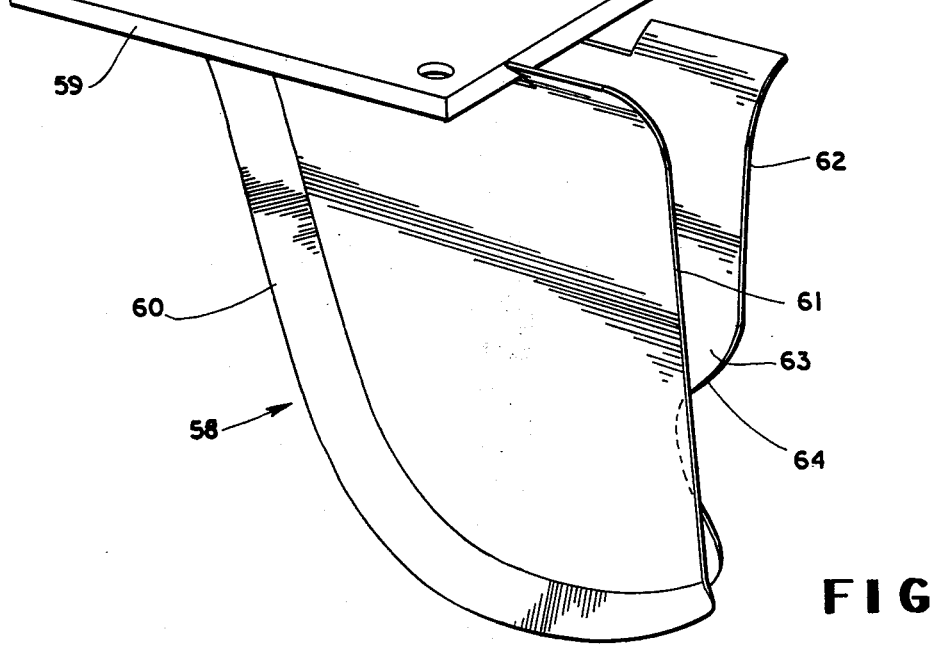
FIG. 5 is a perspective illustration of the planting shoe of the dibble assembly.

As shown in FIG. 5, the planting shoe or dibble 58 comprises upper support plate 59, a downwardly extending cutting tool 60 and a pair of rearwardly extending parallel plates or side walls 61 and 62. The cutting tool 60 is wedge shaped in cross section (not shown) so that its leading edge is relatively pointed, and the cutting tool is curved along its vertical length into a shallow L-shape. The parallel plates 61 and 62 have their forward edges attached to the rear side edges of the cutting tool, so that the parallel plates each extend rearwardly from opposite rear side edges of the cutting tool. The parallel plates 61 and 62 form a pocket 63 therebetween, and the plate 62 has a relief or notch 64 formed in its rear edge so that at least a portion of its rear edge is offset forwardly from the rear edge of the plate 61.

Seedling ejector fingers 66 and 67 are attached to the end plate 68 of the housing 55 (FIGS. 6 and 7) and extend in cantilever fashion rearwardly from the end plate 68 and diverge laterally from each other at their ends to form between them a seedling receiving slot 69. The fingers 66 and 67 are located above the slot 63 between the parallel plates 61 and 62 of the planting shoe 58.

Double ended ram 70 comprises a cylinder 71 located in the housing 55 and connected to the upwardly turned end 52 of the bracket 51, and one protruding end 72 of the ramrod is connected to the ejector plate 74. The ejector plate defines a pair of openings 75 therein which surround the ejector fingers 66 and 67, and the ejector plate reciprocates over the fingers 66 and 67 with the movement of the ram 70. The opposite protruding end 76 of the ramrod includes a projection 78 thereon which is movable toward and away from micro switch 79. Clod breaker plate 80 depends from ejector plate 74 down into the slot 63 of the planting shoe 58 and reciprocates with the ejector plate 74.

Limiting arm 81 is located in housing 55 and is connected at one of its ends to axle 49 and its other end protrudes from the housing 55. A curved feeler plate 82 is connected to the outer end 83 of the limiting arm 81, and the feeler plate 82 projects downwardly and rearwardly from the housing 55. When the feeler plate is moved upwardly with respect to the housing 55, and when the feeler plate engages the ground upon downward arcuate movement of the housing 55, the limiting arm 81 engages micro switch 84. Micro switches 79 and 84 are rigidly mounted in housing 55 on opposite sides of support arm 85, with the micro switch 84 being located over the limiting arm 81 and the micro switch 79 being located above the path of movement of the protrusion 78 of the ram 70. An operator's switch 85 is mounted on the top of housing 55 just forwardly of the ejector fingers 66 and 67.

As illustrated in FIGS. 1 and 2, the packing wheel assembly 16 includes arm 86 mounted at one of its ends on axle 49 so that it oscillates in a vertical plane about the axle. Packing wheel 88 is mounted on the other end of arm 86. As illustrated in FIGS. 2 and 3, packing wheel 88 includes an annular ground engaging surface 89 which has a larger diameter at its side portion 90 away from the planting shoe 58 than it does at its other side portion 91 which is closer to the planting shoe and its annular ground engaging surface 89 is approximately of truncated conical shape with a concave surface extending from the larger to the smaller diameter portions. The packing wheel 88 is rotatable about an axis 92 that is inclined upwardly from the position of the packing wheel over the path of travel of the planting shoe 58 (FIG. 3) and is angled forwardly from the position of the packing wheel in the direction of movement of the spot planter.

As illustrated in FIGS. 1 and 3, the packing wheel 88 is movable up and down through a vertical arc of movement under the influence of ram 94 while dibble assembly 15 is movable up and down through a vertical arc of movement under the influence of ram 95. Ram 96 is connected between the support frame element 98 and mounting plate 18 (FIG. 1) and functions to move the spot planter 10 in a vertical arc up or down about the gimbal assembly 19. Shock absorbers 99 (only one shown) are connected between the support frame 12 and the packing wheel assembly 16 and between the support frame and the dibble assembly 15 to dampen the movements of these assemblies with respect to the frame.

The movements of the spot planter are actuated by a hydraulic system (not shown) as will be understood by those skilled in the art, where the pump for the system is mounted on the tractor 11 and hose connections from the tractor are made to the control solenoids 100 of the spot planter. Additional hydraulic tanks 101 can be mounted on the support frame 12 if desired to supplement the quantity of hydraulic fluid supplied by the tractor.

Figure 8B:
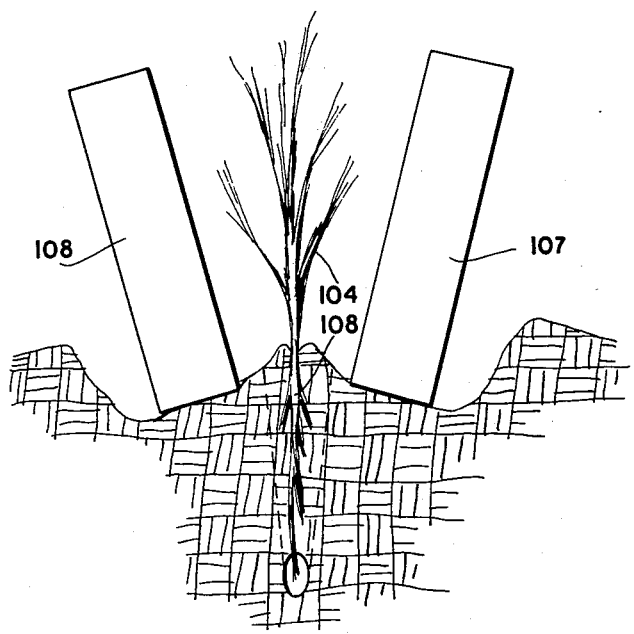
FIG. 8B is a schematic illustration of a planting pocket, a seedling in the planting pocket, and of a prior art packing arrangement.
Figure 8A:
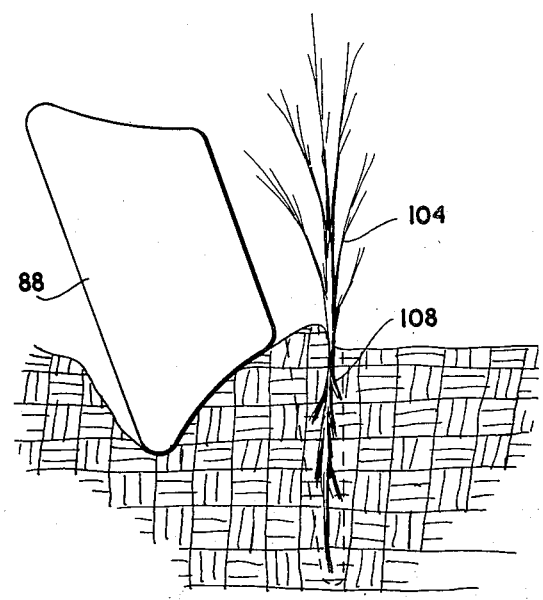
FIG. 8A is a schematic illustration of a planting pocket, a seedling in the planting pocket, and the packing wheel.

When the spot planter is in operation, the worker is seated in the passenger compartment 14 on the seat 102, and the worker faces opposite to the direction of movement of the tractor and spot planter. Seedlings 104 are held in ready position adjacent the worker in the container 105 mounted on the passenger compartment 14 within easy reach of the worker. As the tractor 11 moves in a forward direction, the worker removes a seedling 104 from the container 105 and inserts the seedling between the fingers 66 and 67 of the seedling ejector. The worker next depresses the switch 85 on the upper rear surface of the housing 55 of the dibble assembly 15, which causes the movement of the system to begin. The first movement is actuated by ram 95 which distends and moves the dibble assembly in a downward arc until planting shoe 58 penetrates the earth and forms a planting pocket 108 in the soil (FIG. 8A). As the planting shoe 58 moves in a downward direction, the limiting arm 81 moves in unison therewith until the feeler plate 82 engages the top surface of the soil, whereupon the limiting arm stops its downward arcuate movement. As the housing 55 continues to move in a downward arc, the limiting arm 81 moves relative to the housing and closes switch 84 (FIG. 6). Switch 84 actuates ram 70 of the seedling ejector (FIG. 6) and ram 94 of the packing wheel assembly 86. Ram 70 moves its ramrod to the right (FIG. 6) so that the ejector plate 74 moves along the fingers 66 and 67 and sweeps or ejects the seedling 104 rearwardly with respect to the spot planter so that the seedling drops vertically into the planting pocket. In the meantime, the packing wheel 88 moves downwardly into engagement with the earth (FIG. 8A) and sweeps and packs the soil toward the planting pocket and roots of the seedling to close the planting pocket. The shape of the packing wheel 88 and the angle of the axis of rotation of the planting wheel causes the soil to be swept laterally toward the planting pocket and to be compressed substantially below the surface of the soil and the indentation made in the soil is spaced away from the seedling so that the height of the soil at the seedling is not lowered but remains substantially level with the surrounding soil. The impression made in the soil is spaced away from the seedling and forms an irrigation pocket. By contrast, if a pair of prior art packing wheels such as the type illustrated at 107 and 108 in FIG. 8B were utilized, the surface of the soil adjacent the seedling would be likely to be lowered and therefore possibly exposing the upper roots of the seedling.

When the ram 70 approaches the end of its outward stroke so that the seedling 104 is completely ejected from between fingers 66 and 67, the protrusion 78 of the ram end 76 engages the micro switch 79 and micro switch 79 reverses the movements of rams 94 and 95 to lift the packing wheel assembly 16 and the dibble assembly and seedling ejector 15. These elements remain in their up positions until the cycle is initiated again by the worker in the passenger compartment 14.

If the planting shoe 58 should engage a rock or other hard object during its downward stroke, the hydraulic system would allow the planting shoe to pause as it rides over the obstruction, and when the planting shoe clears the obstruction it would continue to move downwardly in the soil to form the planting pocket. Should the planting shoe engage an obstruction and be thrust laterally by its forward movement about the obstruction, the gimbal assembly 19 permits the support frame 12 to shift laterally through a horizontal arc, so that the planting shoe and its related elements are not likely to be damaged.

When the planting shoe 58 is operated in clay or other types of soils that tend to form clods of dirt, the relief or notched portion 64 of the side wall 62 of the planting shoe tends to allow the dirt moving around the outside of the side wall 62 to engage and influence the clods of dirt between the side walls to move rearwardly with respect thereto, so that such clods or other obstructions are induced to move out of the confines of the slot 63 of the planting shoe. In addition, the clod breaker plate 80 which depends from the ejector plate 74 continually reciprocates back and forth with the ejector plate 74 in the slot 63 of the planting shoe and tends to agitate any clods of dirt that might be present in the planting shoe, causing the slots of dirt to break apart and fall out of the planting shoe.

While this invention has been described in detail with particular reference to preferred embodiments thereof, it will be understood that variations and modifications can be effected within the spirit and scope of the invention as described hereinbefore and as defined in the appended claims.

I claim:

1. A spot planter comprising a frame movable forwardly over the ground behind a towing vehicle, a passenger compartment supported by said frame and including means for supporting a passenger facing opposite to the forward direction of movement of said frame, dibble means mounted on said frame and movable up and down adjacent said passenger compartment to cut planting pockets along a path in the ground, seedling ejector means movable up and down with said dibble means for inserting seedlings into the planting pockets, packing means mounted on said frame and movable up and down beside and behind said dibble means to close the planting pockets, said packing means comprising a wheel including an annular ground engaging surface with one side portion of the annular ground engaging surface being of larger diameter than the other side portion thereof and with the larger diameter portion of said wheel being positioned away from the path of the planting pockets and the smaller diameter portion of said wheel being positioned adjacent the path of the planting pockets, said wheel being rotatable about an axis inclined upwardly from the position of the wheel toward the planting pockets and angled forwardly from the position of the wheel toward the line of the pockets whereby when the wheel engages the ground adjacent a planting pocket it tends to sweep the soil toward the planting pocket and to press the soil at a downward inclined angle toward the lower portion of the planting pocket substantially without reducing the height of the soil adjacent the seedling.

2. The spot planter of claim 1 and wherein said dibble means includes a planting shoe comprising a wedge shaped ground cutting tool and a pair of parallel side walls each having forward edges located adjacent the sides of said cutting tool and extending rearwardly of said cutting tool with portions of the rear edges of one of the side walls offset longitudinally from the rear edges of the other side wall.

3. A spot planter comprising a frame movable forwardly over the ground behind a towing vehicle, dibble means mounted on said frame and movable in a path along the ground and movable toward and away from the ground to cut into the ground and form planting pockets in the ground, and means for inserting a seedling or the like into the planting pockets, the improvement therein of a packing means support mounted on said frame pivotable from said frame about a horizontal axis, a packing wheel mounted on said packing means support and positioned behind and to the side of said dibble means and movable toward and away from the ground to engage the ground adjacent the planting pockets and close the planting pockets, said packing wheel including an annular ground engaging surface with one side portion of said ground engaging surface being of larger diameter than the other side portion of said ground engaging surface, said packing wheel being positioned with its smaller diameter ground engaging surface located adjacent the path of said dibble means and its larger diameter ground engaging surface located further away from the path of said dibble, said packing wheel being rotatable about an axis inclined upwardly from the location of said packing wheel toward the path of said dibble and angled forwardly from the location of said packing wheel toward the path of said dibble, whereby when said packing wheel is pivoted downwardly into engagement with the ground adjacent a planting pocket it moves along a straight line path adjacent one side of the pocket and parallel to the line of motion of said moving spot planter, it compresses and sweeps the dirt adjacent the planting pocket laterally toward the planting pocket and forms a depression in the ground away from the seedling in the pocket without exposing the upper roots of the seedling.

4. The combination of claim 3 and wherein the annular ground engaging surface of said packing wheel is concave and of approximately truncated conical shape.

5. The combination of claim 3 and wherein said dibble means include a planting shoe comprising a wedge shaped ground cutting tool movable forwardly through the ground and a pair of parallel side walls each having forward edges adjacent the sides of said cutting tool and extending rearwardly from the sides of said cutting tool, the improvement therein of means for cleaning out soil lodged in said planting shoe between said parallel side walls and for reducing the tendency of soil to form a clod between said side walls, said means comprising a cut out area defined in one of said side walls and extending forwardly from the rear edge of said one side wall.

* * * * *